(12) United States Patent
Chien et al.

(10) Patent No.: US 9,390,863 B2
(45) Date of Patent: Jul. 12, 2016

(54) COMPOSITE ELECTRODE AND ELECTROLYTIC CAPACITOR

(71) Applicant: Industrial Technology Research Institute, Hsinchu (TW)

(72) Inventors: Hung-Chung Chien, Chiayi County (TW); Yi-Chang Du, Taoyuan County (TW); Li-Duan Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 184 days.

(21) Appl. No.: 14/487,101

(22) Filed: Sep. 16, 2014

(65) Prior Publication Data

US 2015/0187496 A1 Jul. 2, 2015

(30) Foreign Application Priority Data

Dec. 30, 2013 (TW) .............................. 102149045 A (51) Int. Cl.
| | |
|---|---|
| *H01G 9/04* | (2006.01) |
| *H01G 9/022* | (2006.01) |
| *H01G 9/028* | (2006.01) |
| *H01G 9/035* | (2006.01) |
| *H01G 9/07* | (2006.01) |
| *H01G 9/15* | (2006.01) |

(52) U.S. Cl.
CPC .............. *H01G 9/022* (2013.01); *H01G 9/028* (2013.01); *H01G 9/035* (2013.01); *H01G 9/07* (2013.01); *H01G 9/15* (2013.01)

(58) Field of Classification Search
None
See application file for complete search history.

(56) References Cited

U.S. PATENT DOCUMENTS

| | | | | |
|---|---|---|---|---|
| 3,483,438 | A | * 12/1969 | Sharbaugh | H01G 9/028 252/62.2 |
| 3,872,358 | A | 3/1975 | Murakami et al. | |
| 4,805,074 | A | * 2/1989 | Harakawa | H01G 9/0029 29/25.03 |

(Continued)

FOREIGN PATENT DOCUMENTS

| | | |
|---|---|---|
| CN | 103117410 | 5/2013 |
| TW | 200504774 | 2/2005 |

(Continued)

OTHER PUBLICATIONS

Song et al., "Fabrication of solid aluminum electrolytic capacitors utilizing conductive polyaniline solutions," Synthetic Metals, Mar. 2012, pp. 368-pp. 374.

(Continued)

*Primary Examiner* — Dion R Ferguson
(74) *Attorney, Agent, or Firm* — Birch, Stewart, Kolasch & Birch, LLP (57) ABSTRACT

Provided is a composite electrode including a metal layer and a composite dielectric layer. The composite dielectric layer includes a metal oxide dielectric layer and a polymer dielectric layer. The composite dielectric layer overlays the metal layer. The polymer dielectric layer includes a nitrogen-containing polymer and overlays the metal oxide dielectric layer. An electrolytic capacitor is also provided. The electrolytic capacitor has a polymer dielectric layer made of a nitrogen-containing polymer, and such polymer dielectric layer is beneficial to increase the insulating property of the metal oxide dielectric layer and the coverage property of the conductive polymer. Thereby, the conventional leakage current can be significantly reduced and the yield can be improved.

20 Claims, 2 Drawing Sheets

(56) References Cited

U.S. PATENT DOCUMENTS

| | | |
|---|---|---|
| 7,027,292 B2 | 4/2006 | Anzai et al. |
| 7,116,549 B2 | 10/2006 | Anzai et al. |
| 7,166,138 B2 | 1/2007 | Anzai et al. |
| 7,460,358 B2 | 12/2008 | Biler |
| 7,483,259 B2 | 1/2009 | Biler |
| 7,666,326 B2 | 2/2010 | Yoshida et al. |
| 7,746,623 B2 | 6/2010 | Murakami et al. |
| 7,760,488 B2 | 7/2010 | Breznova et al. |
| 7,938,866 B2 | 5/2011 | Biler |
| 2004/0205947 A1 | 10/2004 | Oda et al. |
| 2005/0141173 A1* | 6/2005 | Tseng .................... H01G 9/025 361/525 |
| 2005/0219801 A1* | 10/2005 | Yano .................... H01G 9/0032 361/523 |
| 2007/0072362 A1* | 3/2007 | Tseng .................... H01G 9/025 438/239 |
| 2012/0300370 A1 | 11/2012 | Chacko |
| 2014/0313638 A1* | 10/2014 | Kato ........................ H01G 9/07 361/524 |

FOREIGN PATENT DOCUMENTS

| | | |
|---|---|---|
| TW | I239542 | 9/2005 |
| TW | 201030784 | 8/2010 |

OTHER PUBLICATIONS

Nogami et al., "The effects of hyperbranched poly(siloxysilane)s on conductive polymer aluminum solid electrolytic capacitors," Journal of Power Sources, Apr. 15, 2007, pp. 584-pp. 589.

Miao et al., "Fabrication and evaluation of Zn containing fluoridated hydroxyapatite layer with Zn release ability," Acta Biomaterialia, Mar. 2008, pp. 441-pp. 446.

Rodriguez et al., "Influence of boron surface enrichment on the growth mode of BGaAs epilayers grown on GaAs by metalorganic vapour phase epitaxy," Thin Solid Films, Oct. 1, 2008, pp. 8424-8430.

"Office Action of Taiwan Counterpart Application", issued on Sep. 12, 2014, p. 1-p. 7.

* cited by examiner

COMPOSITE ELECTRODE AND ELECTROLYTIC CAPACITOR

CROSS-REFERENCE TO RELATED APPLICATION

This application claims the priority benefit of Taiwan application serial no. 102149045, filed on Dec. 30, 2013. The entirety of the above-mentioned patent application is hereby incorporated by reference herein and made a part of this specification.

BACKGROUND

1. Technical Field

The technical field relates to a composite electrode and an electrolytic capacitor.

2. Background

Improving the electrolyte conductivity has long been one of the major topics in the development of an electrolytic capacitor. The electrolyte with a high conductivity can reduce the equivalent series resistance (ESR) of the electrolytic capacitor, so as to provide high reliability and low impedance at high frequency. A conductive polymer has a higher conductivity than a liquid electrolyte or a solid organic semiconductor complex salt (e.g. tetracyanoquinodimethane (TCNQ) complex salt) used for conventional capacitors, and exhibits an adequate insulating property at high temperature. Besides, the conductive polymer is safe and free of explosion of a liquid capacitor caused by liquid evaporation. Therefore, such conductive polymer has become the mainstream of the solid electrolyte for existing electrolytic capacitors.

In recent years, high voltage conductive polymer capacitors have been widely applied in vehicles. The reliability of the high voltage conductive polymer capacitors is poor for some reasons. First, when the material of the oxide layer is aluminium oxide formed by anodization, the aluminium oxide layer is inhomogeneous. Therefore, cracks are easily generated at grain boundaries so as to cause a leakage current. Besides, the conductive polymer has poor film properties and is highly brittle. In long-term use, the vibration from the environment causes deformation of the conductive polymer and breakdown of the oxide layer. Moreover, the conductive polymer has poor film foil ling property and therefore is not able to completely cover the surface of the oxide layer of the capacitor, resulting in a high leakage current, a high impedance and a low yield of the capacitor. The said reasons cause a significantly high leakage current and even a short circuit, and the yield of the high voltage capacitor is accordingly reduced.

SUMMARY

One of exemplary embodiments provides a composite electrode, which includes a metal layer and a composite dielectric layer. The composite dielectric layer is disposed on the metal layer and includes a metal oxide dielectric layer and a polymer dielectric layer, wherein the polymer dielectric layer includes a nitrogen-containing polymer and is disposed on a surface of the metal oxide dielectric layer.

One of exemplary embodiments provides an electrolytic capacitor, which includes a first electrode, a composite dielectric layer, a solid and liquid hybrid electrolyte layer and a second electrode. The composite dielectric layer is disposed on the first electrode and includes a metal oxide dielectric layer and a polymer dielectric layer, wherein the polymer dielectric layer includes a nitrogen-containing polymer and is disposed on a surface of the metal oxide dielectric layer. The solid and liquid hybrid electrolyte layer is disposed on the polymer dielectric layer. The second electrode is disposed on the solid and liquid hybrid electrolyte layer.

One of exemplary embodiments provides an electrolytic capacitor, which includes a first electrode, a composite dielectric layer, a solid electrolyte layer and a second electrode. The composite dielectric layer is disposed on the first electrode and includes a metal oxide dielectric layer and a polymer dielectric layer, wherein the polymer dielectric layer includes a nitrogen-containing polymer and is disposed on a surface of the metal oxide dielectric layer. The solid electrolyte layer is disposed on the polymer dielectric layer. The second electrode is disposed on the solid electrolyte layer.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

One of exemplary embodiments provides a composite electrode for the anode of an electrolytic capacitor. The composite electrode includes a polymer dielectric layer made of a nitrogen-containing polymer, and such polymer dielectric layer is beneficial to increase the insulating property of a metal oxide dielectric layer and the coverage property of a conductive polymer, and accordingly reduce the leakage current of a solid electrolytic capacitor.

Figure 1:
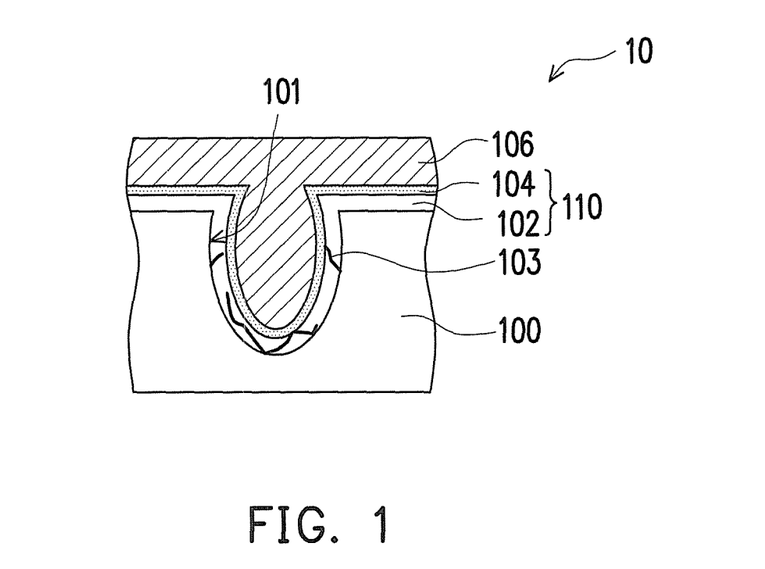
FIG. 1 is a schematic cross-sectional view of a composite electrode according to an exemplary embodiment.

FIG. 1 is a schematic cross-sectional view of a composite electrode according to an exemplary embodiment.

Referring to FIG. 1, a composite electrode 10 of one exemplary embodiment includes a metal layer 100 and a composite dielectric layer 110. The composite dielectric layer 110 includes a metal oxide dielectric layer 102 and a polymer dielectric layer 104. The metal layer 100 is called a valve metal layer and includes aluminium, tantalum, niobium or an alloy thereof. In an embodiment, the metal layer 100 can be a meso-porous substrate with a plurality of pores 101.

The metal oxide dielectric layer 102 is disposed on the metal layer 100. Specifically, the metal oxide dielectric layer 102 is disposed on the surfaces of the metal layer 100 and the pores 101. In an embodiment, the metal oxide dielectric layer 102 is directly disposed on the surface of the metal layer 100. In another embodiment, the metal oxide dielectric layer 102 is disposed above the metal layer 100 with at least one layer interposing between the metal oxide dielectric layer 102 and the metal layer 100. The metal oxide dielectric layer 102 includes aluminium oxide, tantalum oxide, niobium oxide or a combination thereof. The metal oxide dielectric layer 102 can be formed by coating a dielectric material on the metal layer 100. Alternatively, the metal oxide dielectric layer 102 can be a metal oxide layer formed by performing a surface oxidation to the metal layer 100 with an electrochemical reaction during a reforming step.

Besides, when the material of the metal oxide dielectric layer 102 is aluminium oxide formed by anodization during the reforming step, the aluminium oxide layer is inhomogeneous. Therefore, cracks 103 are easily generated at grain boundaries of the dielectric layer so as to cause a leakage current. However, in the composite electrode 10 of the embodiment, the polymer dielectric layer 104 made of a nitrogen-containing polymer is disposed on the metal oxide dielectric layer 102 for repairing the cracks 103. Therefore, the conventional leakage issue can be resolved, and the yield of the capacitor can be improved.

The nitrogen-containing polymer of one exemplary embodiment includes a primary amine polymer, a secondary amine polymer, a tertiary amine polymer, a quaternary ammonium polymer or a combination thereof. More specifically, the nitrogen-containing polymer includes polyvinylpyrrolidone (PVP), polyvinylpyridine, polyacrylamide, polyethyleneimine, ammonium polystyrene sulfonate, polyacrylonitrile, a nitrogen-containing cross-linked polymer (e.g. a nitrogen-containing epoxy resin), or a copolymer or a derivative copolymer containing at least one of the above polymers.

In an embodiment, the nitrogen-containing polymer can be polyvinylpyrrolidone having a weight-average molecular weight of about 10,000 to 1,300,000. In another embodiment, the nitrogen-containing polymer can be a cross-linked nitrogen-containing epoxy resin (product name: EXA851, available from Everwide Chemical Co., Ltd.). In yet another embodiment, the nitrogen-containing polymer can be polystyrene sulfonate, ammonium salt (PSSNH$_4$).

The composite electrode 10 of the embodiment can further include an electrolyte layer 106. The electrolyte layer 106 is disposed on the polymer dielectric layer 104. Specifically, the electrolyte layer 106 is disposed on the surface of the polymer dielectric layer 104 filling in the pores 101. In an embodiment, the electrolyte layer 106 can be a solid electrolyte layer. In another embodiment, the electrolyte layer 106 can be a solid and liquid hybrid electrolyte layer including both a solid electrolyte and a liquid electrolyte. Besides, in the solid and liquid hybrid electrolyte layer, the solid electrolyte thereof has an electronic conductivity, and the liquid electrolyte thereof has an ionic conductivity.

The solid electrolyte layer or the solid and liquid hybrid electrolyte layer includes at least one material selected from a solid electrolyte, a liquid electrolyte and a solvent. The solid electrolyte includes polythiophene, a polythiophene derivative, polypyrrole, a polypyrrole derivative, polyaniline, a polyaniline derivative or a combination thereof. The liquid electrolyte includes tetramethyl ammonium salt, trimethyl ethyl ammonium salt, phthalic acid, malonic acid, succinic acid, glutaric acid, adipic acid, pimelic acid, azelaic acid, sebacic acid, boric acid, methyl amine, ethyl amine, diethylamine, dimethylamine, methylethylamine, methylpropylamine, trimethyl amine, dimethylethylamine, dimethylpropylamine, diethylmethylamine, triethylamine or a derivative thereof or a combination thereof. The solvent includes ethylene glycol, polyethylene glycol, sulfolane, 3-methylsulfolane, 2,4-dimethylsulfolane, gamma-butyrolactone or a combination thereof.

In an embodiment, the solid electrolyte includes poly(3,4-ethylenedioxythiophene) or a derivative thereof, and the derivative has a structure represented by the following formula:

wherein n is an integer of 0 to 5 and "*" represents a bonding site, and wherein the monomer for solid electrolyte synthesis can be used alone or in combination with another monomer having a different structure at a different mixing ratio.

Figure 2:
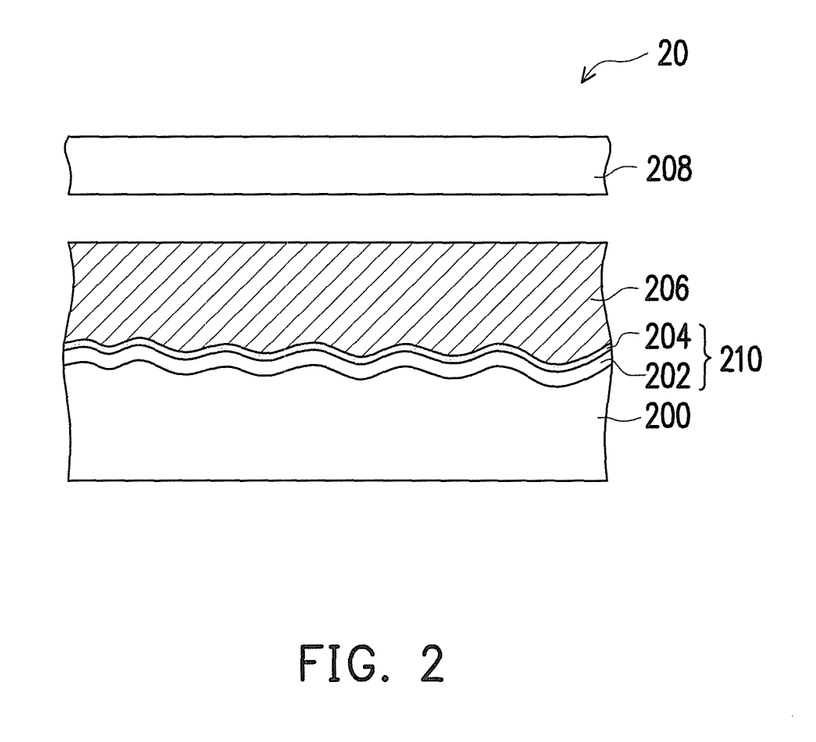
FIG. 2 is a schematic cross-sectional view of an electrolytic capacitor according to an exemplary embodiment.

FIG. 2 is a schematic cross-sectional view of an electrolytic capacitor according to an exemplary embodiment.

Referring to FIG. 2, an electrolytic capacitor 20 of one exemplary embodiment includes a first electrode 200, a metal oxide dielectric layer 202, a polymer dielectric layer 204, a solid electrolyte layer or a solid and liquid hybrid electrolyte layer 206, and a second electrode 208. The metal oxide dielectric layer 202 and the polymer dielectric layer 204 constitute a composite dielectric layer 210. The metal oxide dielectric layer 202 is disposed on the first electrode 200. The polymer dielectric layer 204 includes a nitrogen-containing polymer and is disposed on the metal oxide dielectric layer 202. The solid electrolyte layer or the solid and liquid hybrid electrolyte layer 206 is disposed on the polymer dielectric layer 204. The first electrode 200, the metal oxide dielectric layer 202, the polymer dielectric layer 204, and the solid electrolyte layer or the solid and liquid hybrid electrolyte layer 206 of FIG. 2 are similar to the metal layer 100, the metal oxide dielectric layer 102, the polymer dielectric layer 104, and the electrolyte layer 106 of FIG. 1, and the details are not iterated herein.

The second electrode 208 is disposed on the solid electrolyte layer or the solid and liquid hybrid electrolyte layer 206. The second electrode 208 is made of a conductive material including carbon, aluminium, silver or a combination thereof. In an embodiment, the second electrode 208 is an aluminium substrate with a layer or nickel, nickel oxide, carbon or silicon nitride coated thereon. In another embodiment, the second electrode 208 can include metal or carbide. The metal can be aluminium, tantalum, silver or niobium. The carbide can be artificial graphite, natural graphite, carbon powder, carbon fibre, carbon nanotubes (CNT), graphene or a mixture thereof. In yet another embodiment, the second electrode 208 can be a gel mixture or a double-layer structure including carbon and silver.

Besides, the first electrode 200, the second electrode 208, and the solid electrolyte layer or the solid and liquid hybrid electrolyte layer 206 are arranged in a form of winding or stacking.

In this embodiment, the first electrode 200 can serve as an anode (or positive electrode), second electrode 208 can serve as a cathode (or negative electrode), and a separator can be disposed between the first electrode 200 and the second electrode 208, more specifically, between the solid electrolyte layer or the solid and liquid hybrid electrolyte layer 206 and the second electrode 208.

Figure 3:
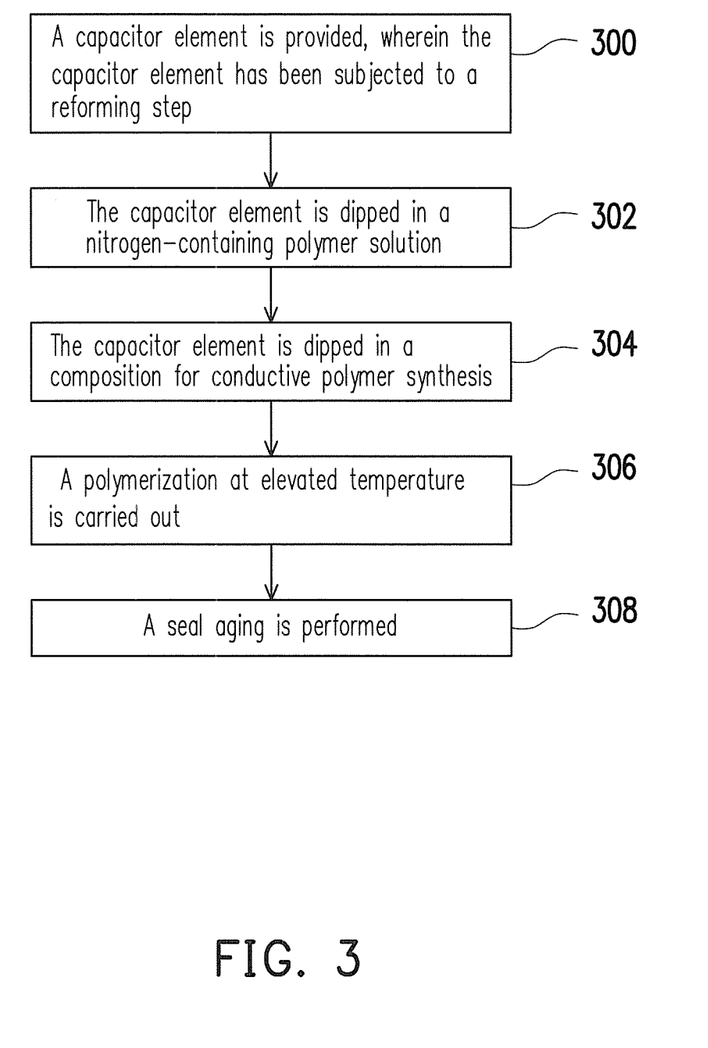
FIG. 3 is a process flow of a method of fabricating an electrolytic capacitor according to an exemplary embodiment.

FIG. 3 is a process flow of a method of fabricating an electrolytic capacitor according to an exemplary embodiment.

Referring to FIG. 3, a step 300 is implemented, in which a capacitor element is provided, and the capacitor element has been subjected to a reforming step. Specifically, the capacitor element is wound and subjected to a chemical reforming. The step 300 includes the following sub-steps. The surface of a metal electrode is oxidized by an electrochemical electrolysis reaction, so as to form a positive electrode with a metal oxide dielectric layer. Another metal electrode is subjected to chemical erosion, so as to form a negative electrode with a high surface area. Thereafter, the positive electrode with the metal oxide dielectric layer and the negative electrode are wound together with an interposed separator, so as to fabricate the capacitor element.

Thereafter, a step 302 is implemented, in which the capacitor element is dipped in a nitrogen-containing polymer solution (or called a modifying solution) and baked at an appropriate temperature, so as to form a polymer dielectric layer on the metal oxide dielectric layer. The nitrogen-containing polymer solution or the modifying solution has a solids content of about 1 wt % to 10 wt %, or about 2.5 wt % to 6 wt %. In an embodiment, the reformed element is dipped in a 5 wt % polyacrylamide aqueous solution for five minutes, and dried in an oven at 125° C. for one hour.

Afterwards, a step 304 is implemented, in which the capacitor element is dipped in a composition for conductive polymer synthesis. In an embodiment, the composition for conductive polymer synthesis includes a monomer solution and an oxidant solution.

In an embodiment, the monomer solution includes a monomer for conductive polymer synthesis and a solvent. For example, the monomer solution includes 10 wt % to 70 wt % of the monomer, and the solvent for balance. The oxidant solution includes 10 wt % to 70 wt % of an oxidant and a solvent for balance. The molar ratio of the monomer to the oxidant (monomer/oxidant) is about 0.1 to 1, for example.

In another embodiment, the monomer solution includes 20 wt % to 50 wt % of a monomer, and a solvent for balance. The oxidant solution includes an oxidant and a solvent. For example, the oxidant solution includes 20 wt % to 60 wt % of the oxidant, and the solvent for balance. The molar ratio of the monomer to the oxidant (monomer/oxidant) is about 0.1 to 0.7, for example.

In yet another embodiment, the monomer solution and the oxidant solution form a mixed solution, which includes 20 wt % to 40 wt % of a monomer, 25 wt % to 50 wt % of an oxidant, and a solvent for balance.

The monomer for conductive polymer synthesis in the monomer solution includes thiophene, a thiophene derivative, pyrrole, a pyrrole derivative, aniline, an aniline derivative, or a combination thereof. In an embodiment, the monomer solution includes 3,4-ethylenedioxythiophene or a derivative thereof, and the derivative has a structure represented by the following formula:

wherein n is an integer from 0 to 5 and "*" represents a bonding site, and wherein the monomer can be used alone or in combination with another monomer having a different structure at a different mixing ratio.

The oxidant in the oxidant solution includes a ferric ion-containing salt. The ferric ion-containing salt exemplarily includes ferric benzenesulfate, ferric p-toluenesulfonate, ferric chloride, ferric nitriate, ferric sulfate, or a combination thereof.

The solvent of the monomer solution or the oxidant solution includes water, alcohol or an appropriate organic solvent. The solvent can be, for example but not limited to, methanol, ethanol, propanol, N,N-dimethylacetamide (DMAc), ethylene glycol, polyethylene glycol, dimethyl sulfoxide (DMSO), tetrahydrofuran (THF), dimethyl fumarate (DMF) or the like, or a mixture including two or more of the said solvents.

In an embodiment, the forming method of the composition for conductive polymer synthesis includes dipping the capacitor element in a monomer solution and then an oxidant solution. In another embodiment, the capacitor element is dipped in an oxidant solution and followed by a monomer solution. In yet another embodiment, the forming method of the composition for conductive polymer synthesis includes simultaneously dissolving a monomer and an oxidant in a solvent. The dipping time of the composition for conductive polymer synthesis is about 30 minutes, and the temperature is set at about 20° C. to 100° C., for example.

Then, a step 306 is implemented to carry out a polymerization at elevated temperature, in which a polymerization reaction is accelerated with increasing temperature, so as to form a conductive polymer on the surface of the dielectric layer. The conductive polymer serves as an electrolyte of the capacitor. The elevated temperature up to 170° C. maximum is provided to ensure a complete polymerization. The temperature is increased at a rate of 5° C. per minute. The polymerization time is 1 hour to 12 hours, for example. The conductive polymer formed from the polymerization can be, for example but not limited to, a polythiophene, a polythiophene derivative, a polypyrrole, a polypyrrole derivative, a polyaniline, a polyaniline derivative, or a copolymer thereof.

Next, a step 308 is implemented to perform a seal aging, in which the capacitor element is encased in a case, sealed and aged. The case is an aluminium case, for example. The capacitor element is sealed with rubber. The electrolytic capacitor is thus completed. The electrolytic capacitor can have a static capacitance of about 5 μF to 400 μF, a 100 kHz equivalent series resistance (ESR) of about 7 mΩ to 50 mΩ and a leakage current (LC) of about 500 μA to 0.1 μA.

The said embodiment in which the electrolyte in the electrolytic capacitor is a solid electrolyte is provided for illustration purposes, and is not construed as limiting the present application. In another embodiment, the electrolyte in the electrolytic capacitor can be a solid and liquid hybrid electrolyte. In such case, after the capacitor element is dipped in a composition for solid electrolyte synthesis (step 304) and before the capacitor element is subjected to a polymerization at elevated temperature (step 306), the capacitor element can be dipped in a liquid electrolyte, and thus, the space in the capacitor element can be completely filled with the liquid electrolyte. The liquid electrolyte includes tetramethyl ammonium salt, trimethyl ethyl ammonium salt, phthalic acid, malonic acid, succinic acid, glutaric acid, adipic acid, pimelic acid, azelaic acid, sebacic acid, boric acid, methyl amine, ethyl amine, diethylamine, dimethylamine, methylethylamine, methylpropylamine, trimethyl amine, dimethylethylamine, dimethylpropylamine, diethylmethylamine, triethylamine or a derivative thereof or a combination thereof. The solvent includes ethylene glycol, polyethylene glycol, sulfolane, 3-methylsulfolane, 2,4-dimethylsulfolane, gamma-butyrolactone or a combination thereof.

In view of the above, in an electrolytic capacitor of one exemplary embodiment, a polymer dielectric layer made of a nitrogen-containing polymer is disposed on a metal oxide dielectric layer, and such polymer dielectric layer exhibits an excellent coverage property with the metal oxide dielectric layer and the solid electrolyte layer. Therefore, the leakage current of the solid electrolytic capacitor can be reduced and the yield of the same can be improved. In an embodiment, the nitrogen-containing polymer dielectric layer is not provided with a hydrolysis function, and physical adsorption (rather than chemical adsorption) is present between the polymer dielectric layer and the metal oxide dielectric layer or the solid electrolyte layer. In other words, the polymer dielectric layer can be easily formed with a superior insulating property and an excellent compatibility with the dielectric layer and the conductive polymer when the capacitor element is dipped in the nitrogen-containing polymer solution (step 302), and a reforming step is not required after the dipping of the nitrogen-containing polymer solution

EXAMPLES 1-4 AND COMPARATIVE EXAMPLES 1-4

An aluminium anode foil was subjected to an electrochemical electrolysis reaction at 143 V, so as to form an $Al_2O_3$ dielectric layer on the aluminium anode foil. Thereafter, the aluminium anode foil having the $Al_2O_3$ dielectric layer and a carbon cathode foil having a high surface area were wound together with an interposed separator, so as to form a capacitor element. Then, the capacitor element was optionally put in an organic acid solution for repairing the damaged $Al_2O_3$ dielectric layer. Thereafter, the capacitor element was dipped in a modifying solution listed in Table 1 and then baked. Afterwards, the capacitor element was dipped in a 3,4-ethylenedioxythiophene (EDOT) monomer solution and followed by a ferric p-toluene-sulfonate (Fe(III) p-tosylate) oxidant solution, and a polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 63 V. Solid electrolytic capacitors of Examples 1-4 and Comparative Examples 1-4 were thus completed.

The properties such as yield, capacitance, 120 Hz equivalent series resistance (ESR), dissipation factor (DF), 100 kHz equivalent series resistance (ESR), leakage current (LC) and withstand voltage of the solid electrolytic capacitors of Examples 1-4 and Comparative Examples 1-4 were measured and listed in Table 1.

TABLE 1

| | Modifying solution (2.5 wt %) | Yield | | Capacitance (μF) | 120 Hz ESR (mΩ) | DF (%) | 100 kHz ESR (mΩ) | LC (uA) | Withstand voltage (V) |
|---|---|---|---|---|---|---|---|---|---|
| | Reforming voltage: 143 V, Operating voltage: 63 V | | | | | | | | |
| Example 1 | PVP/methanol Mw: 10,000 | 90% | Ave. Stdev | 24.3 0.16 | 974.7 104.2 | 1.79 0.18 | 21.21 0.91 | 9.6 1.7 | 107.1 2.49 |
| Example 2 | PVP/methanol Mw: 1,300,000 | 100% | Ave. Stdev | 24.1 0.21 | 984.0 75.1 | 1.79 0.12 | 21.01 1.13 | 10.6 2.0 | 111.9 0.77 |
| Example 3 | Polyacrylamide/ water | 100% | Ave. Stdev | 24.2 0.14 | 1257.9 186.7 | 2.29 0.33 | 22.29 1.04 | 4.6 2.3 | 114.6 0.9 |
| Example 4 | PAN/ dimethyl acetamide | 90% | Ave. Stdev | 24.8 0.12 | 1019.2 249.7 | 1.91 0.46 | 18.0 0.75 | 2.0 0.5 | 90.2 1.6 |
| Comparative Example 1 | Not used | 70% | Ave. Stdev | 22.7 0.82 | 3109.0 459.9 | 5.29 0.63 | 39.97 3.31 | 2.0 0.4 | 81.8 6.55 |
| Comparative Example 2 | PVA/water | 90% | Ave. Stdev | 23.1 0.52 | 1867.6 263.4 | 3.25 0.40 | 24.6 1.50 | 11.6 3.0 | 89.3 2.71 |
| Comparative Example 3 | PPG/methanol | 70% | Ave. Stdev | 22.3 0.58 | 2020.6 193.7 | 3.38 0.24 | 27.1 1.61 | 12.0 2.8 | 88.8 4.81 |
| Comparative Example 4 | Imidazole/methanol | 80% | Ave. Stdev | 23.5 0.56 | 1000.7 130.7 | 1.77 0.20 | 20.9 1.34 | 51.9 85.2 | 101.3 3.73 |

Note 1:
The average and standard deviation were calculated from the test results of 10 capacitors for each example.
Note 2:
PVP (Mw: 10,000) stands for polyvinylpyrrolidone having a weight-average molecular weight of 10,000.
PVP (Mw: 1,300,000) stands for polyvinylpyrrolidone having a weight-average molecular weight of 1,300,000.
PAN stands for polyacrylonitrile having a weight-average molecular weight of 150,000.
PVA stands for polyvinylalcohol.
PPG stands for polypropylene glycol.

As shown in Table 1, in the case where the nitrogen-containing polymer solution, e.g. a solution of PVP (Mw: 10,000), PVP (Mw: 1,300,000), polyacrylamide or PAN homopolymer of Examples 1-4, is used as a modifying solution, a polymer dielectric layer can be formed on the surface of the metal oxide dielectric layer, so as to effectively improve the yield, capacitance and withstand voltage of the solid electrolytic capacitor, and reduce the dissipation factor (DF) value, 120 Hz ESR and 100 kHz ESR of the same. On the contrary, in the case where no modifying solution is used, as shown in the results of the conventional solid electrolytic capacitor of Comparative Example 1, the DF value and 120 Hz ESR of the solid electrolytic capacitor is high, and the yield is poor. Besides, in the case where a solution other than the nitrogen-containing polymer solution, e.g. a solution of PVA, PPG or imidazole of Comparative Examples 2-4, is used as a modifying solution, the yield of the solid electrolytic capacitor is low, the leakage current is high and the performance is accordingly affected. Although the capacitor in which imidazole is used as a modifying solution exhibits some good properties, the yield is low and the leakage current of the product is high.

EXAMPLE 5 AND COMPARATIVE EXAMPLE 5

An aluminium anode foil was subjected to an electrochemical electrolysis reaction at 175 V, so as to form an $Al_2O_3$ dielectric layer on the aluminium anode foil. Thereafter, the aluminium anode foil having the $Al_2O_3$ dielectric layer and a carbon cathode foil having a high surface area were wound together with an interposed separator, so as to form a capacitor element. Then, the capacitor element was optionally put in an organic acid solution for repairing the damaged $Al_2O_3$ dielectric layer. Thereafter, the capacitor element was dipped in a modifying solution listed in Table 2 and then baked. Afterwards, the capacitor element was dipped in a 3,4-ethylenedioxythiophene (EDOT) monomer solution and followed by a ferric p-toluene-sulfonate (Fe(III) p-tosylate) oxidant solution, and a polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 80 V. Solid electrolytic capacitors of Example 5 and Comparative Example 5 were thus completed. The ripple current test was carried out by charging the capacitor with a voltage of 80 V and a current of 1.9 A at 125° C. for 3,000 hours. The properties of the solid electrolytic capacitors of Example 5 and Comparative Example 5 were measured and listed in Table 2.

As shown in Table 2, in the case where the nitrogen-containing polymer solution, e.g. a solution of polyacrylamide of Example 5, is used as a modifying solution, a polymer dielectric layer can be formed on the surface of the metal oxide dielectric layer. Even after a 1,000-hour or 3,000-hour ripple current life test, the properties of the solid electrolytic capacitor change little. On the contrary, in the case where no modifying solution is used, as shown in the results of the conventional solid electrolytic capacitor of Comparative Example 5, the solid electrolytic capacitor is completely failed after tested for 1,000 hours.

EXAMPLE 6 AND COMPARATIVE EXAMPLE 6

An aluminium anode foil was subjected to an electrochemical electrolysis reaction at 65 V, so as to form an $Al_2O_3$ dielectric layer on the aluminium anode foil. Thereafter, the aluminium anode foil having the $Al_2O_3$ dielectric layer and a carbon cathode foil having a high surface area were wound together with an interposed separator, so as to form a capacitor element. Then, the capacitor element was optionally put in an organic acid solution for repairing the damaged $Al_2O_3$ dielectric layer. Thereafter, the capacitor element was dipped in a modifying solution listed in Table 3 and then baked to cross-link the epoxy resin. Afterwards, the capacitor element was dipped in a 3,4-ethylenedioxythiophene (EDOT) monomer solution and followed by a ferric p-toluene-sulfonate (Fe(III) p-tosylate) oxidant solution, and a polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 30 V. Solid electrolytic capacitors of Example 6 and Comparative Example 6 were thus completed. The properties of the solid electrolytic capacitors of Example 6 and Comparative Example 6 were measured and listed in Table 3.

TABLE 2

| | | | | | 120 Hz | | 100 kHz | |
| | Modifying solution | Time (hour) | | Capacitance (μF) | ESR (mΩ) | DF (%) | ESR (mΩ) | LC (uA) |
|---|---|---|---|---|---|---|---|---|
| | Reforming voltage: 175 V, Operating voltage: 80 V | | | | | | | |
| Example 5 | Polyacrylamide | 0 | Ave. | 18.3 | 1071.0 | 1.47 | 18.2 | 0.7 |
| | | | Stdev | 0.14 | 18.1 | 0.03 | 1.15 | 0.1 |
| | | 1,000 | Ave. | 18.8 | 1293.3 | 1.83 | 21.9 | 2.6 |
| | | | Stdev | 0.16 | 35.0 | 0.05 | 2.84 | 0.9 |
| | | 3,000 | Ave. | 18.6 | 1392.0 | 1.95 | 23.9 | 1.6 |
| | | | Stdev | 0.15 | 47.9 | 0.07 | 1.76 | 0.3 |
| Comparative Example 5 | Not used | 0 | Ave. | 19.0 | 1092.9 | 1.57 | 20.6 | 5.8 |
| | | | Stdev | 0.17 | 52.2 | 0.08 | 1.31 | 12.8 |
| | | 1,000 | Ave. | — | — | — | — | — |
| | | | Stdev | — | — | — | — | — |

Note 1:
The average and standard deviation were calculated from the test results of 10 capacitors for each example.

Note 2:
The modifying solution of Example 5 is a 2.5 wt % polyacrylamide aqueous solution.

TABLE 3

Reforming voltage: 65 V, Operating voltage: 30 V

|  | Modifying solution | Yield | Capacitance (µF) | 120 Hz ESR (mΩ) | DF (%) | 100 kHz ESR (mΩ) | LC (uA) |
|---|---|---|---|---|---|---|---|
| Example 5 | EPOXY EXA851 | 80% | 102.85 | 136.43 | 1.06 | 10.70 | 137 |
| Comparative Example 5 | Not used | 0% | — | — | — | — | Short circuit |

Note 1: The modifying solution of Example 6 is a 5 wt % EPOXY EXA851 (product name, available from Everwide Chemical Co., Ltd.) acetic ether solution.

As shown in Table 3, even though the metal oxide dielectric layer formed at a low reforming voltage (e.g. 65V) has poor properties, in the case where the nitrogen-containing epoxy resin solution, e.g. a solution of EPDXY EXA851 of Example 6, is used as a modifying solution, a cross-linked polymer dielectric layer can be formed on the surface of the metal oxide dielectric layer, so as to provide modification for the metal oxide dielectric layer, and thus, the properties of the solid electrolytic capacitor can be maintained in a certain level. On the contrary, in the case where no modifying solution is used, as shown in the results of the conventional solid electrolytic capacitor of Comparative Example 6, many cracks are present in the dielectric layer, leading to a short circuit and complete failure of the solid electrolytic capacitor.

EXAMPLE 7 AND COMPARATIVE EXAMPLE 7

An aluminium anode foil was subjected to an electrochemical electrolysis reaction at 143 V, so as to form an $Al_2O_3$ dielectric layer on the aluminium anode foil. Thereafter, the aluminium anode foil having the $Al_2O_3$ dielectric layer and a carbon cathode foil having a high surface area were wound together with an interposed separator, so as to form a capacitor element. Then, the capacitor element was optionally put in an organic acid solution for repairing the damaged $Al_2O_3$ dielectric layer. Thereafter, the capacitor element was dipped in a modifying solution listed in Table 4 and then baked. Afterwards, the capacitor element was dipped in a 3,4-ethylenedioxythiophene (EDOT) monomer solution and followed by a ferric p-toluene-sulfonate (Fe(III) p-tosylate) oxidant solution, and a polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 63 V. Solid electrolytic capacitors of Example 7 and Comparative Example 7 were thus completed. The properties of the solid electrolytic capacitors of Example 7 and Comparative Example 7 were measured and listed in Table 4.

As shown in Table 4, even though the metal oxide dielectric layer formed at 143 V has acceptable properties, in the case where the nitrogen-containing polymer solution, e.g. a solution of ammonium polystyrene sulfonate of Example 7, is used as a modifying solution, a polymer dielectric layer can be formed on the surface of the metal oxide dielectric layer, so as to provide modification for the metal oxide dielectric layer, and thus, the properties of the solid electrolytic capacitor can be maintained in a certain level. On the contrary, in the case where a solution other than the nitrogen-containing modifying solution is used, as shown in the results of the solid electrolytic capacitor of Comparative Example 7, the properties, leakage current and yield of the solid electrolytic capacitor of Comparative Example 7 are worse than those of the solid electrolytic capacitor of Example 7.

EXAMPLES 8-9 AND COMPARATIVE EXAMPLE 8

An aluminium anode foil was subjected to an electrochemical electrolysis reaction at 175 V, so as to form an $Al_2O_3$ dielectric layer on the aluminium anode foil. Thereafter, the aluminium anode foil having the $Al_2O_3$ dielectric layer and a carbon cathode foil having a high surface area were wound together with an interposed separator, so as to form a capacitor element. Then, the capacitor element was optionally put in an organic acid solution for repairing the damaged $Al_2O_3$ dielectric layer. Thereafter, the capacitor element was dipped in a modifying solution listed in Table 5 and then baked. Afterwards, the capacitor element was dipped in a 3,4-ethylenedioxythiophene (EDOT) monomer solution and followed by a ferric p-toluene-sulfonate (Fe(III) p-tosylate) oxidant solution, and a polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 80 V. Solid electrolytic capacitors of Examples 8-9 and Comparative Example 8 were thus completed. The properties of the solid

TABLE 4

Reforming voltage: 143 V, Operating voltage: 63 V

|  | Modifying solution (Yield) |  | Capacitance (µF) | 120 Hz ESR (mΩ) | DF (%) | 100 kHz ESR (mΩ) | LC (uA) |
|---|---|---|---|---|---|---|---|
| Example 7 | Ammonium polystyrene sulfonate (100%) | Ave. | 24.3 | 622.9 | 1.14 | 20.35 | 35.7 |
|  |  | Stdev | 0.05 | 20.4 | 0.04 | 1.21 | 9.4 |
| Comparative Example 7 | Sodium polystyrene sulfonate (70%) | Ave. | 23.5 | 1000.7 | 1.77 | 20.9 | 51.9 |
|  |  | Stdev | 0.56 | 130.7 | 0.20 | 1.34 | 85.2 | electrolytic capacitors of Examples 8-9 and Comparative Example 8 were measured and listed in Table 5.

TABLE 5

Reforming voltage: 175 V, Operating voltage: 80 V

|  | Modifying solution (Yield) |  | Capacitance (μF) | 120 Hz ESR (mΩ) | DF (%) | 100 kHz ESR (mΩ) | LC (uA) |
|---|---|---|---|---|---|---|---|
| Example 8 | 4 wt % polyacrylamide (80%) | Ave Stdev | 18.2 0.28 | 1362.4 37.5 | 1.87 0.05 | 19.8 1.00 | 1.8 2.1 |
| Example 9 | 6 wt % polyacrylamide (60%) | Ave Stdev | 17.4 0.12 | 1535.0 36.0 | 2.01 0.04 | 22.7 0.55 | 0.9 0.2 |
| Comparative Example 8 | Not used (20%) | Ave Stdev | 17.4 0.00 | 3274.0 42.4 | 4.30 0.06 | 24.5 0.71 | 3.4 0.6 |

As shown in Table 5, even though the metal oxide dielectric layer formed at 175 V has acceptable properties, in the case where the nitrogen-containing polymer solution of Examples 8-9 is used as a modifying solution, a polymer dielectric layer can be formed on the surface of the metal oxide dielectric layer, so as to provide modification for the metal oxide dielectric layer, and thus, the properties of the solid electrolytic capacitor can be improved. On the contrary, in the case where no modifying solution is used, as shown in the results of the conventional solid electrolytic capacitor of Comparative Example 8, the properties, leakage current and yield of the solid electrolytic capacitor of Comparative Example 8 are worse than those of the solid electrolytic capacitors of Examples 8-9.

EXAMPLES 10-11 AND COMPARATIVE EXAMPLES 9-10

An aluminium anode foil was subjected to an electrochemical electrolysis reaction at 330 V, so as to form an $Al_2O_3$ dielectric layer on the aluminium anode foil. Thereafter, the aluminium anode foil having the $Al_2O_3$ dielectric layer and a carbon cathode foil having a high surface area were wound together with an interposed separator, so as to form a capacitor element. Then, the capacitor element was optionally put in an organic acid solution for repairing the damaged $Al_2O_3$ dielectric layer. Thereafter, the capacitor element was dipped in a modifying solution listed in Table 6 and then baked. Afterwards, the capacitor element was dipped in a 3,4-ethylenedioxythiophene (EDOT) monomer solution and followed by a ferric p-toluene-sulfonate (Fe(III) p-tosylate) oxidant solution, and a polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 125 V. Solid electrolytic capacitors of Examples 10-11 and Comparative Examples 9-10 were thus completed. The properties of the solid electrolytic capacitors of Examples 10-11 and Comparative Examples 9-10 were measured and listed in Table 6.

TABLE 6

Reforming voltage: 330 V, Operating voltage: 125 V

|  | Polyacrylamide modifying solution wt % (Yield) | Electrolyte |  | Capacitance (μF) | 120 Hz ESR (mΩ) | DF (%) | 100 kHz ESR (mΩ) | LC (uA) |
|---|---|---|---|---|---|---|---|---|
| Example 10 | 2.5 wt % (80%) | Solid | Ave Stdev | 7.8 0.18 | 3919.4 100.9 | 2.31 0.08 | 25.1 0.45 | 3.2 6.0 |
| Example 11 | 2.5 wt % (100%) | Solid/Liquid | Ave Stdev | 8.3 0.18 | 2975.5 123.7 | 1.86 0.10 | 25.6 1.80 | 1.7 1.9 |
| Comparative Example 9 | Not used (50%) | Solid | Ave Stdev | 7.2 0.07 | 8597.3 718.7 | 4.69 0.36 | 35.8 2.35 | 0.9 0.3 |
| Comparative Example 10 | Not used (100%) | Liquid | Ave Stdev | 7.9 0.17 | 18524.3 447.9 | 11.03 0.29 | 7,880.0 111.98 | 2.0 0.3 |

Note:
Liquid electrolyte composition: 10 g of azelaic acid and 0.7 g of ethyldimethylamine were dissolved in a mixture solution of polyethylene glycol/gamma-butyrolactone/sulfolane.

As shown in Table 6, even though the metal oxide dielectric layer formed at 330 V has acceptable properties, in the case where the nitrogen-containing polymer solution of Examples 10-11 is used as a modifying solution, a polymer dielectric layer can be formed on the surface of the metal oxide dielectric layer, so as to provide modification for the metal oxide dielectric layer, and thus, the properties of the solid electrolytic capacitor can be improved. In Example 11, the liquid electrolyte is added after formation of the conductive polymer, so that the capacitance extraction rate can be further increased, and the high/low frequency impedance can be further reduced. On the contrary, in the case where no modifying solution is used, as shown in the results of the solid electrolytic capacitor of Comparative Example 9, the properties and yield of the solid electrolytic capacitor of Comparative Example 9 are worse than those of the solid electrolytic capacitor of Example 10. The liquid electrolytic capacitor of Comparative Example 10 exhibits a good yield, but the impedance thereof is relatively higher. In terms of capacitance or impedance, the solid and liquid hybrid electrolytic capacitor of Example 11 is superior to the capacitors of Comparative Examples 9-10.

In summary, in the solid electrolytic capacitor of one exemplary embodiment, a polymer dielectric layer made of a nitrogen-containing polymer is disposed on a metal oxide dielectric layer, so as to increase the insulating property of the metal oxide dielectric layer. Besides, the polymer dielectric layer has excellent compatibility with a conductive polymer, such that the coverage property of the conductive polymer can be enhanced. Thus, the leakage current can be reduced and the yield of the solid electrolytic capacitor can be improved. In addition, as compared to the solid electrolytic capacitor in which no modifying solution is used or a solution other than the nitrogen-containing polymer solution is used, the solid electrolytic capacitor dipped in the nitrogen-containing polymer solution exhibits higher yield, capacitance and withstand voltage as well as lower DF value, 120 Hz ESR and 100 kHz ESR, thereby proving the nitrogen-containing polymer dielectric layer has an unexpected effect.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A composite electrode, comprising:
a metal layer; and
a composite dielectric layer, disposed on the metal layer and comprising a metal oxide dielectric layer and a polymer dielectric layer, wherein the polymer dielectric layer comprises a nitrogen-containing polymer and is disposed on a surface of the metal oxide dielectric layer.

2. The composite electrode of claim 1, wherein the nitrogen-containing polymer comprises a primary amine polymer, a secondary amine polymer, a tertiary amine polymer, a quaternary ammonium polymer or a combination thereof.

3. The composite electrode of claim 1, wherein the nitrogen-containing polymer comprises polyvinylpyrrolidone, polyvinylpyridine, polyacrylamide, polyethyleneimine, ammonium polystyrene sulfonate, polyacrylonitrile, a nitrogen-containing epoxy resin, or a copolymer or a derivative copolymer containing at least one of the above polymers.

4. The composite electrode of claim 1, the metal layer comprises aluminium, tantalum, niobium or an alloy thereof.

5. The composite electrode of claim 1, the metal oxide dielectric layer comprises aluminium oxide, tantalum oxide, niobium oxide or a combination thereof.

6. An electrolytic capacitor, comprising:
a first electrode;
a composite dielectric layer, disposed on the first electrode and comprising a metal oxide dielectric layer and a polymer dielectric layer, wherein the polymer dielectric layer comprises a nitrogen-containing polymer and is disposed on a surface of the metal oxide dielectric layer;
a solid and liquid hybrid electrolyte layer, disposed on the polymer dielectric layer; and
a second electrode, disposed on the solid and liquid hybrid electrolyte layer.

7. The electrolytic capacitor of claim 6, wherein the nitrogen-containing polymer comprises a primary amine polymer, a secondary amine polymer, a tertiary amine polymer, a quaternary ammonium polymer or a combination thereof.

8. The electrolytic capacitor of claim 6, wherein the nitrogen-containing polymer comprises polyvinylpyrrolidone, polyvinylpyridine, polyacrylamide, polyethyleneimine, ammonium polystyrene sulfonate, polyacrylonitrile, a nitrogen-containing epoxy resin, or a copolymer or a derivative copolymer containing at least one of the above polymers.

9. The electrolytic capacitor of claim 6, wherein a solid electrolyte of the solid and liquid hybrid electrolyte layer has an electronic conductivity, and the solid electrolyte comprises polythiophene, a polythiophene derivative, polypyrrole, a polypyrrole derivative, polyaniline, a polyaniline derivative or a combination thereof.

10. The electrolytic capacitor of claim 6, wherein a liquid electrolyte of the solid and liquid hybrid electrolyte layer has an ionic conductivity, and the liquid electrolyte comprises tetramethyl ammonium salt, trimethyl ethyl ammonium salt, phthalic acid, malonic acid, succinic acid, glutaric acid, adipic acid, pimelic acid, azelaic acid, sebacic acid, boric acid, methyl amine, ethyl amine, diethylamine, dimethylamine, methylethylamine, methylpropylamine, trimethyl amine, dimethylethylamine, dimethylpropylamine, diethylmethylamine, triethylamine or a derivative thereof or a combination thereof.

11. The electrolytic capacitor of claim 6, wherein a solid electrolyte of the solid and liquid hybrid electrolyte layer comprises poly(3,4-ethylenedioxythiophene) or a derivative thereof, and the derivative has a structure represented by the following formula:

wherein n is an integer of 0 to 5, and "*" represents a bonding site.

12. The electrolytic capacitor of claim 6, wherein the first electrode comprises aluminium, tantalum, niobium or an alloy thereof.

13. The electrolytic capacitor of claim 6, wherein the metal oxide dielectric layer comprises aluminium oxide, tantalum oxide, niobium oxide or a combination thereof.

14. The electrolytic capacitor of claim 6, wherein the second electrode comprises carbon, aluminium, silver or a combination thereof.

15. The electrolytic capacitor of claim 6, wherein the first electrode, the second electrode and the solid and liquid hybrid electrolyte layer are arranged in a form of winding or stacking.

16. An electrolytic capacitor, comprising:
a first electrode;
a composite dielectric layer, disposed on the first electrode and comprising a metal oxide dielectric layer and a polymer dielectric layer, wherein the polymer dielectric layer comprises a nitrogen-containing polymer and is disposed on a surface of the metal oxide dielectric layer;
a solid electrolyte layer, disposed on the polymer dielectric layer; and
a second electrode, disposed on the solid electrolyte layer.

17. The electrolytic capacitor of claim 16, wherein the nitrogen-containing polymer comprises a primary amine polymer, a secondary amine polymer, a tertiary amine polymer, a quaternary ammonium polymer or a combination thereof.

18. The electrolytic capacitor of claim 16, wherein the nitrogen-containing polymer comprises polyvinylpyrrolidone, polyvinylpyridine, polyacrylamide, polyethyleneimine, ammonium polystyrene sulfonate, polyacrylonitrile, a nitrogen-containing epoxy resin, or a copolymer or a derivative copolymer containing at least one of the above polymers.

19. The electrolytic capacitor of claim 16, wherein the solid electrolyte layer comprises polythiophene, a polythiophene derivative, polypyrrole, a polypyrrole derivative, polyaniline, a polyaniline derivative or a combination thereof.

20. The electrolytic capacitor of claim 16, wherein the solid electrolyte layer comprises poly(3,4-ethylenedioxythiophene) or a derivative thereof, and the derivative has a structure represented by the following formula:

wherein n is an integer of 0 to 5, and "*" represents a bonding site.

* * * * *